United States Patent [19]

Steinbichler

[11] Patent Number: 5,759,476
[45] Date of Patent: Jun. 2, 1998

[54] METHOD FOR PROCESSING PLASTIC MATERIAL

[75] Inventor: Georg Steinbichler, Rottenmann, Austria

[73] Assignee: Engel Maschinenbau Gesellschaft m.b.H., Schwertberg, Austria

[21] Appl. No.: 680,130

[22] Filed: Jul. 15, 1996

[30] Foreign Application Priority Data

Jul. 17, 1995 [AT] Austria ................ GM 387 U

[51] Int. Cl.⁶ ........................................ B29C 45/14
[52] U.S. Cl. ................. 264/512; 264/255; 264/259; 264/266; 264/573; 425/130
[58] Field of Search ................ 264/513, 572, 264/511, 255, 259, 266, 512, 45.1; 425/130

[56] References Cited

U.S. PATENT DOCUMENTS

| | | |
|---|---|---|
| 3,865,915 | 2/1975 | Garner . |
| 4,104,353 | 8/1978 | Monnet ................ 264/255 |
| 4,968,474 | 11/1990 | Ito . |
| 5,204,051 | 4/1993 | Jaroschek ................ 264/572 |
| 5,433,910 | 7/1995 | Mukai et al. ................ 264/355 |

FOREIGN PATENT DOCUMENTS

| | | |
|---|---|---|
| 0393315 | 2/1990 | European Pat. Off. . |
| 438279 | 7/1991 | European Pat. Off. ........ 264/572 |
| 0498444 | 8/1992 | European Pat. Off. . |
| 0585799 | 8/1993 | European Pat. Off. . |
| 0624447 | 4/1994 | European Pat. Off. . |
| 4240017 | 6/1991 | Germany . |
| 3-121820 | 5/1991 | Japan ........................ 264/572 |
| 2025838 | 1/1980 | United Kingdom . |
| 2260932 | 5/1993 | United Kingdom . |

*Primary Examiner*—Catherine Timm
*Attorney, Agent, or Firm*—Notaro & Michalos PC

[57] ABSTRACT

A method of processing plastic material, wherein the plastic material is pressure-lessly distributed over the lower mold half of a mold divided in a horizontal plane, then the mold is closed and the mold cavity is entirely filled with molten material whereupon a fluid is injected into the molten material and a portion of the molten material is displaced into a secondary cavity by the fluid.

6 Claims, 2 Drawing Sheets

METHOD FOR PROCESSING PLASTIC MATERIAL

FIELD AND BACKGROUND OF THE INVENTION

The invention relates to a method of processing plastic material, wherein the plastic material is pressure-lessly distributed over the lower mold half of a mold divided in a horizontal plane, then the mold is closed and the mold cavity is entirely filled with molten material whereupon a fluid is injected into the molten material.

While most plastic articles are produced by the injection of plastic material under pressure into the closed mold, there are nonetheless situations in which it is more desirable for the plastic material to be distributed in a pressure-less condition in the open mold. Generally that situation arises if uniform distribution of the plastic material by injection can be effected only with difficulty. The reason for that may be that the mold cavity affords resistance to a uniform flow through the mold cavity of the injected plastic material.

More important for practice is the pressing of plastic material when connecting shaped thermoplastic portions to flat material which would suffer damage under the conditions of injection molding. Injection pressing usually operates with pressures of the order of magnitude of 50 through 100 bars which are far below the usual injection pressure of the order of magnitude of 350 bars although the viscosity of the plastic material is here selected to be deliberately high. More specifically in injection pressing the important consideration is not to distribute the plastic material with as little friction as possible, but rather the important point is that the distribution of the plastic material, which is already achieved prior to closure of the mold, is essentially maintained. In that sense, a low temperature of the molten material and a considerable proportion of long-fiber reinforcing substances in the plastic material is not a disadvantage.

In recent years, in injection molding it has become increasingly the usual practice to introduce into the plastic material which is firstly introduced into the mold, a further material which fills up cavities in the plastic material. Transference of that method to injection pressing and in particular back-pressing of inserts or inlays has hitherto occurred only with very great hesitation. More specifically, on the one hand this presupposes that the items of equipment have to be adapted as the pressure occurring when the second material is introduced is substantially higher than the pressure necessary for distribution of the plastic material in the mold. If exceptionally the subsequent introduction of a fluid into a plastic material which has been introduced into the open mold has been proposed, at any event any greater movement of the plastic material which has already been introduced, along the wall of the mold is prevented, insofar as either the mold was firstly only incompletely filled (see U.S. Pat. No. 4,968,474) or insofar as the mold was gradually increased in size upon introduction of the second medium (see EP 0 488 444 A2). In both known cases the procedure was restricted to a gas as the subsequently introduced fluid.

SUMMARY OF THE INVENTION

The invention is based on the surprising realization that under the method conditions of injection pressing it is also possible for the mold to be firstly completely filled and then for a part of the molten material to be displaced by a fluid into a secondary cavity. Particularly when the situation involves producing an article of large area which in its interior or at the surface has an insert or an inlay and which is provided with reinforcing ribs, the invention leads to a completely unexpected result. It is now possible for the insert or inlay to be surrounded by a first plastic material and for that plastic material then to be displaced out of the region of the ribs and in particular replaced with a glass fiber reinforced plastic material. Therefore, for the first time there is here proposed a two-stage method in which in a first method step an insert or inlay is pressed behind in the open mold and in a second method step material is injected therebehind in the closed mold. The underlying consideration is that, after the initial step of pressing behind the insert or inlay, it is already protected from fold formation to such a degree that it is possible to forgo the gentle pressing procedure and the second plastic material can be injected under the usual pressure of 50 through 350 bars. That pressure can be maintained during cooling of the molding, whereby shrinkage of the molding is prevented, in contrast to pressure-less cooling involved in injection pressing.

BRIEF DESCRIPTION OF THE DRAWINGS

Further details of the invention are described hereinafter with reference to the drawing.

DESCRIPTION OF THE PREFERRED EMBODIMENT

Figure 1:
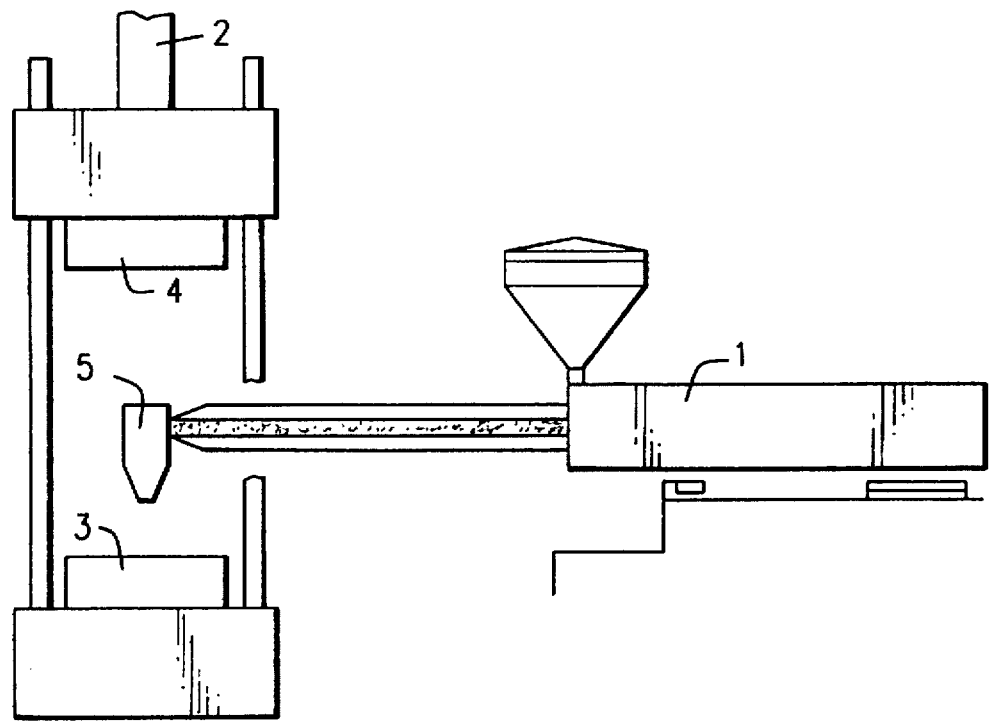
FIG. 1 is a diagrammatic side view of an known apparatus for back-pressing of inserts or inlays.
Figure 2:
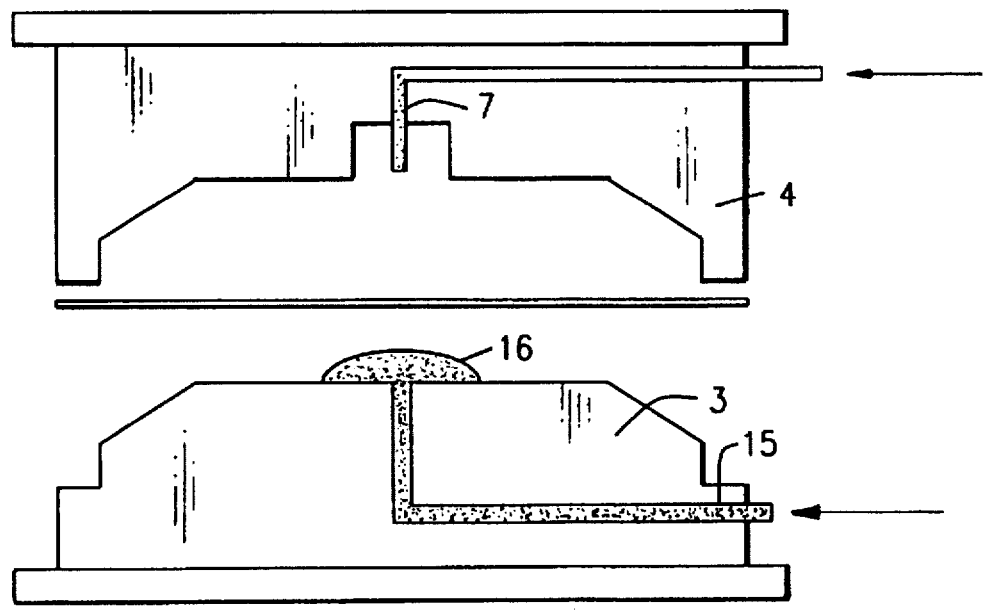
FIG. 2 shows a manner, which is modified relative to FIG. 1, of introducing the plastic material into the opened mold.

The back-pressing procedure can be used economically in particular for large-area moldings. In that case, as shown in FIG. 1, a molten material cake is deposited by a horizontally arranged movable injection unit 1, by means of a wide-slot nozzle 5, in a completely opened, vertical tool. As shown in FIG. 2, the feed of plastic material 16 can also be effected through the tool by means of a duct 15.

In the pressing operation which then takes place, the molding procedure is performed and the connection to the decorative material is made. Due to the good pre-distribution effect, the molten material only has to cover short flow paths during the back-pressing operation which is effected by closing the tool halves 3, 4 by means of the closing unit 2. Therefore only low molten material pressures are required for shaping out the molding geometry.

Figure 3:
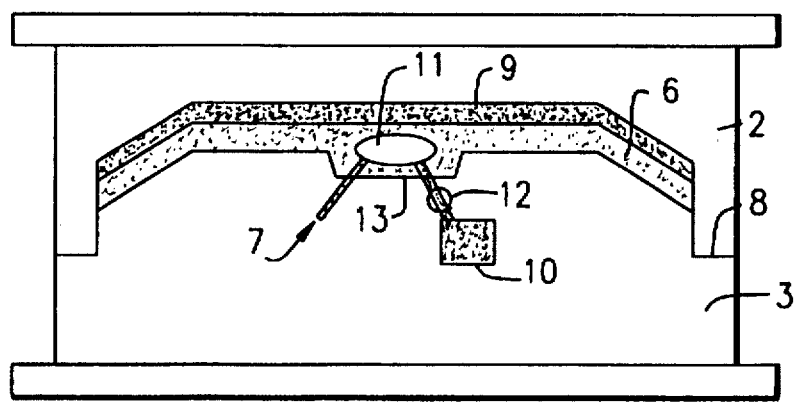
FIG. 3 is a diagrammatic view in section through the closed mold in an embodiment of the invention.

The operating procedure in the mold which is modified by the invention can be seen from FIG. 3. The method includes the following steps:

applying a molten material film or cake to the lower half 3 of the completely opened tool, inserting a textile or foil component 9 anywhere in the mold, a back-pressing operation by closing the tool, injecting a fluid, with displacement of a part of the initially introduced molten material, and cooling of the molding and removal thereof.

The particularity of the method according to the invention is that it can be used to produce shaped bodies which have thickened portions 13 in the form of ribs or the like. For that purpose, more plastic material is firstly introduced into that region of the lower mold half 3 which is intended later to form the rib 13, than in the edge regions. As a result, upon closure of the mold which is provided with a dip edge 8. only slight movements of the molten material relative to the textile insert or inlay 9 are involved. A fluid is pressed through a nozzle 7 into that portion of the mold cavity 6 which is intended later to form the rib 13. As the mold cavity 6 is firstly completely filled with molten material a part of the molten material is displaced by the gas into a secondary cavity 10. That secondary cavity 10 can be shut off by a closure mechanism 12.

A situation of particular attraction is one where the fluid supplied through the nozzle 7 is not a gas but a plastic material which imparts enhanced strength to the rib 13, for example because that plastic material is mixed with glass fibers. Such a plastic material would be less suitable for the first method step, but its local use on the other hand does not cause any problems.

I claim:

1. A method of processing plastic material in a mold having a lower mold half, an upper mold half, the upper and lower mold halves having a closed position against each other and defining a mold cavity between the upper and lower mold halves, the upper and lower mold halves being divided along a horizontal plane and having an open position, the method comprising the steps of:

depositing a molten plastic material cake, pressure-lessly onto the lower mold half while the mold is in said open position;

moving the upper and lower mold halves into the closed position for closing the cavity and thereby spreading the molten plastic material cake to completely fill the mold cavity;

providing a secondary cavity which communicates with the mold cavity; and injecting a fluid under pressure into the molten plastic material cake filling the mold cavity thereby displacing some of the first molten plastic material into the secondary cavity.

2. A method according to claim 1 including placing a flat material into the mold cavity before the upper and lower mold halves are moved to the closed portion.

3. A method of processing plastic material in a mold having a lower mold half, an upper mold half, the upper and lower mold halves having a closed position against each other and defining a mold cavity between the upper and lower mold halves, the upper and lower mold halves being divided along a horizontal plane and having an open position, the method comprising the steps of depositing a first molten plastic material cake, pressure-lessly onto the lower mold half while the mold is in said open position;

moving the upper and lower mold halves into the closed position for closing the cavity and thereby spreading the first molten plastic material cake to completely fill the mold cavity;

providing a secondary cavity which communicates with the mold cavity; and injecting a second molten plastic material into the first molten plastic material cake filling the mold cavity thereby displacing some of the first molten plastic material into the secondary cavity.

4. A method as set forth in claim 3 including shutting the secondary cavity by way of a closure mechanism.

5. A method as set forth in clam 4 wherein the second plastic material contains reinforcing fibers.

6. A method as set forth in claim 3 wherein prior to closure of the mold a flat material is introduced into the mold.

* * * * *